United States Patent
Aussagues et al.

(10) Patent No.: US 9,128,752 B2
(45) Date of Patent: Sep. 8, 2015

(54) METHOD FOR THE DETERMINISTIC EXECUTION AND SYNCHRONIZATION OF AN INFORMATION PROCESSING SYSTEM COMPRISING A PLURALITY OF PROCESSING CORES EXECUTING SYSTEM TASKS

(75) Inventors: Christophe Aussagues, Orsay (FR); Damien Chabrol, Gif sur Yvette (FR); Vincent David, Marcoussis (FR)

(73) Assignee: Commissariat A L'Energie Atomique Et Aux Energies Alternatives, Paris (FR)

( * ) Notice: Subject to any disclaimer, the term of this patent is extended or adjusted under 35 U.S.C. 154(b) by 1001 days.

(21) Appl. No.: 13/124,494

(22) PCT Filed: Oct. 16, 2009

(86) PCT No.: PCT/EP2009/063577
§ 371 (c)(1),
(2), (4) Date: Jun. 15, 2011

(87) PCT Pub. No.: WO2010/043706
PCT Pub. Date: Apr. 22, 2010

(65) Prior Publication Data
US 2011/0302589 A1 Dec. 8, 2011

(30) Foreign Application Priority Data
Oct. 17, 2008 (FR) ..................... 08 05770

(51) Int. Cl.
*G06F 9/46* (2006.01)
*G06F 9/48* (2006.01)
(Continued)

(52) U.S. Cl.
CPC ............ *G06F 9/4843* (2013.01); *G06F 9/3851* (2013.01); *G06F 9/5044* (2013.01); *G06F 2209/483* (2013.01); *G06F 2209/5021* (2013.01)

(58) Field of Classification Search
None
See application file for complete search history.

(56) References Cited

U.S. PATENT DOCUMENTS 5,361,362 A 11/1994 Benkeser et al.
5,481,707 A * 1/1996 Murphy et al. ............... 718/102
(Continued)

FOREIGN PATENT DOCUMENTS

| JP | H02249055 | 10/1990 |
| JP | 2004535607 A | 11/2004 |
| JP | 2008090546 A | 4/2008 |

OTHER PUBLICATIONS

Minyeol Seo et al.: "An Effective Design of Master-Slave Operating System Architecture for Multiprocessor Embedded Systems", Advances in Computer Systems Architecture; [Lecture Notes in Computer Science], Springer Berlin Heidelberg, Berlin, Heidelberg, vol. 4697, Aug. 23, 2007, pp. 114-125.
(Continued)

*Primary Examiner* — Lewis A Bullock, Jr.
*Assistant Examiner* — Wynuel Aquino
(74) *Attorney, Agent, or Firm* — Baker & Hostetler LLP

(57) ABSTRACT

An information processing system includes two processing cores. The execution of an application by the system includes the execution of application tasks and the execution of system tasks, and the system includes a micro-kernel executing the system tasks, which are directly linked to hardware resources. The processing system includes a computation part of the micro-kernel executing system tasks relating to the switching of the tasks on a first core, and a control part of the micro-kernel executing, on a second core, system tasks relating to the control of the task allocation order on the first core.

9 Claims, 5 Drawing Sheets

(51) Int. Cl.
*G06F 9/38* (2006.01)
*G06F 9/50* (2006.01)

(56) References Cited

U.S. PATENT DOCUMENTS

| 8,225,320 B2* | 7/2012 | Sporny et al. ............... 718/102 |
| 2004/0078547 A1 | 4/2004 | David et al. |
| 2010/0088706 A1* | 4/2010 | Dong et al. ................. 718/103 |

OTHER PUBLICATIONS

Vincent Nollet et al.: "A Quick Safari Through the MPSoC Run-Time Management Jungle", Embedded Systems for Real-Time Multimedia, 2007. Estimedia 2007. IEEE/ACM/IFIP Workshop on, IEEE, PI, Oct. 1, 2007, pp. 41-46.

Nollet V et al.: "Designing an operating system for a heterogeneous reconfigurable SoC", Parallel and Distributed Processing Symposium, 2003. Proceedings. International Apr. 22-26, 2003, Piscataway, NJ, USA, IEEE, Apr. 22, 2003, pp. 174-180.

* cited by examiner

METHOD FOR THE DETERMINISTIC EXECUTION AND SYNCHRONIZATION OF AN INFORMATION PROCESSING SYSTEM COMPRISING A PLURALITY OF PROCESSING CORES EXECUTING SYSTEM TASKS

CROSS-REFERENCE TO RELATED APPLICATIONS

This application is a National Stage of International patent application PCT/EP2009/063577, filed on Oct. 16, 2009, which claims priority to foreign French patent application No. FR 08 05770, filed on Oct. 17, 2008, the disclosures of which are incorporated by reference in their entirety.

FIELD OF THE INVENTION

The present invention relates to a method for the deterministic execution and synchronization of an information processing system comprising a plurality of processing cores executing system tasks. It applies notably to the field of microelectronics or to the field of embedded electronic systems with high computing power.

BACKGROUND OF THE INVENTION

The semiconductor industry is faced with a disappointing observation: there are no longer any credible avenues for significantly increasing the performance level of processors, at least not at the individual level. Only the systems that use a plurality of processors operating in parallel still seem to constitute an encouraging avenue for increasing the computing power of the systems. In practice, studies conducted in the 1960s showed that the ratio between the computing power and the efficiency of the computation systems is potentially much higher for parallel systems than for sequential systems. Now, the new applications in fields such as multimedia, communications or real-time processing systems are demanding more and more computing power for consumed power levels and controlled surface areas. Failing being able to increase the processing powers of a single core, the only solution is to multiply the number of cores and to make them operate in parallel, giving rise to a new architectural concept, that of the on-chip parallel system. In the fairly specialized context of processors for embedded systems, this trend to increase the number of execution cores on one and the same chip is very marked. It should tend in the medium term toward the introduction or even the standardization of the systems with several tens or even hundreds of execution cores. Worth citing among these systems are the on-chip multiprocessor systems, usually designated by the acronym "MPSoC", standing for "Multi-Processsor System on Chip".

However, parallel systems are much more difficult to program and to debug than the sequential systems. These programming and debugging difficulties are exacerbated by the ever increasing complexity of the applications. In embedded applications, these difficulties are also increased by the desire to integrate ever more functionalities and by the ongoing increase in the volumes of data to be processed. For example, cell phones associate telecommunication functions with multimedia, positioning, or even gaming functions. This leads to embedded systems in which the intensive computation tasks run alongside control-dominated tasks, with very strong interactions between these various elements of the applications. The synchronization of the processing functions of the different cores to best manage the effective parallelism is then the critical performance and capacity factor in responding to the associated real-time constraints. This is the main difficulty in the effective operation of the parallel architectures of embedded systems. This difficulty has to be looked at from the three-fold aspect of mastery of the indeterminism, mastery of the communications and mastery of the controls. Once a potential parallelism has been identified, extracted from an application and expressed in a program, it is then essential to be capable of effectively implementing this parallelism in a given hardware architecture. In an MPSoC for example, in order to derive the maximum benefit from the work of extraction of the application parallelism done by the programmer, the numerous processing sequences must be best distributed among all the resources of the chip, although these sequences are interlinked by data dependencies or execution control dependencies. Hereinafter, these sequences will be called "execution tasks": an execution task relates to the execution of a processing function on a processing core. It should be noted that software specialists also call it "thread". In the rest of the present application, we will make no distinction, and the term "task" will refer solely to an execution task. In order to organize the execution of these tasks on an MPSoC and to facilitate the work of the developer, the software support for their execution is structured in purely application parts and other so-called "system" parts, the function of which is to abstract the resources of the underlying hardware. In order to better exploit the parallelism expressed by the tasks and that available in the MPSoC, it is necessary to conduct a study relating on the one hand to the way to choose the processing functions to be performed on the various cores and on the other hand to the way of making them operate together, ie to how to structure the basic software controlling the execution of the tasks on the hardware. Thus, in the same way as the program expresses the potential for parallelism of the application, it is essential to find a means of expressing the potential for parallelism of the architecture by an appropriate control of the tasks at the basic software level, generally called "kernel". The study should take into account all the situations that may adversely affect a good use of the potential parallelism of the architecture. First there are the risks of being limited by the access to an essential shared resource such as the central memory, a network, a communication bus or a task manager. There are also risks of not being able to sufficiently finely manage the interdependencies between the tasks, notably when said tasks have a dynamic nature. And finally there are the risks of not being able to master the indeterminisms of the parallel execution, rendering the debugging of the programs complex and difficult. One standard way of addressing this problem is a layered software approach in which at the very least the application layer incorporating the tasks to be executed and the kernel which abstracts the hardware resources and manages the effective execution of the tasks on the machine are distinguished. The kernel is itself conventionally structured in two parts, one called "micro-kernel", which performs all the system functions directly related to the hardware such as management of the registers, of the timers, of the peripheral devices, and so on, and a second which in this document is called "system layer", responsible for the inter-task communications and other high-level task control aspects. The study should culminate in a structuring of the kernel which defines the way in which the processing cores are chosen and the way in which they are made to operate in a coordinated and effective manner. This constitutes one of the major challenges currently facing the microelectronics and embedded software industry and for which the present invention provides a solution.

An existing solution proposes using the processing cores symmetrically to execute the kernel. It is implemented in the architectures of "Symmetric Multiprocessing" (SMP) type. For example, it may involve having an identical kernel of Linux or Windows (registered trademark) type executed on each of the distinct processing cores. However, a major drawback is that a kernel of Linux or Windows (registered trademark) type cannot be executed on two distinct cores in a really simultaneous manner, at least with respect to the critical functions of the kernel. The parallelism is therefore limited to the non-critical functions of the kernel. And that is one of the technical problems that the present invention proposes to resolve by distributing some of the critical functions of the kernel over a plurality of processing cores.

There are also so-called "partition" solutions, which propose that each processing core be dedicated to mutually unaware activities. Interchanges then take place through the sharing of a memory space. For example, the patent application number WO/20071038011 entitled "Real-time threading service for partitioned multiprocessor systems" describes how a core can be dedicated to the execution of real-time tasks supplying results for an application executed by virtue of a non-real-time kernel executed on another core. Similarly, there are solutions in which each core executes a kernel that makes it dedicated to certain types of processing functions (logic computations, intensive computations, taking of input/output interrupts with the network, etc.). A typical example is to have one core dedicated to the computations and the others to the taking of interrupts to serve the peripheral inputs/outputs. In this typical case, the kernel of the computation core makes it possible to perform the computations on asynchronous data originating from the inputs/outputs made available by the core where the taking of interrupts are managed. An interrupt corresponds to the occurrence of an event external to the program, said event triggering the temporary stoppage of the execution of a current task in order to execute another, higher priority task (this change of execution context is called switch). The external event may be the advancing of a real or simulated clock, the higher priority task possibly being triggered by a timer. Such is notably the case with the real-time tasks that are time-constrained, or "Time Triggered" (TT): given that a real-time task must be finished before a given time, it must also be started before a given time which depends on the task execution duration. The real-time tasks are triggered by a timer that is physically paced by a quartz crystal, thus forming a real clock. The external event may also be the completion of a data transfer, the higher priority task is then said to be "Event Triggered" (ET) subject to input-output interrupt. In this type of relatively conventional design, the interrupt-taking core and the computation core are weakly coupled. This type of solution then resembles architectures with co-processors whose coordination relies on the provision of data and of collections of associated signals. One advantage with this solution is that it offers a good responsiveness to fast inputs/outputs, that is to say that it makes it possible to do the associated basic computations without in any way disrupting the scheduling of the processing functions on the computation core. It is effective when the tasks to be executed are independent of one another, that is to say, when they require little or nothing in the way of data interchanges and/or synchronizations. However, when the inputs/outputs require strong synchronizations with the computations or when there are numerous inputs/outputs with different rates, this type of solution is not very effective. And here again is one of the technical problems that the present invention proposes to resolve.

Another existing solution category consists of kernel architectures of "master-slave" type (as presented in the American patent application number US005978838A entitled "Coordination and synchronization of an asymmetric, single-chip, dual multiprocessor"). A core is designated as "master" core and is responsible for managing all the system calls and all the interrupts whereas the other cores are designated as "slave" cores and execute only the algorithmic part of the application tasks. Thus, the master core takes complete charge of the control and allocation of the processing functions to be performed by the other slave cores: it synchronizes their executions. The advantage is simplification of the synchronization problems which are entirely managed by the master processor. The major drawback with this architecture is its strongly centralized nature, the master processor becoming subject to contention problems engendered when a large number of tasks or even of cores is involved: the overall performance levels are then rapidly limited by those of the master processor. Improvements have been proposed such as that published in Advances in Computer Systems Architecture (vol. 4697) entitled "An effective design of master/slave operating system architecture for multiprocessor embedded systems" by Minyeol Seo et al. This publication aims to optimize the scheduling problems. They propose hierarchically organizing the scheduling policy on each core, without in any way releasing the master core from the processing of all the inputs/outputs nor of all the system calls, notably those concerning the inter-task communications. To do this, they define a part of the kernel called "Hardware Abstraction Layer" duplicated on each core and managing the communications between cores ("Inter-Processor Communications" or IPC). The IPC mechanism for synchronizing the cores is a mechanism implemented on the basis of a remote procedure call. Now, this client-server distributed function call mechanism causes blockages: when a task on a core invokes the sending of a message for the attention of another task, it proceeds to call a remote system function, on the master core. The calling core is then blocked until the return calls from this function, preventing any other parallel execution during this time period. Similarly, if the master core is blocked for one reason or another, all the slave cores are also blocked, and vice versa. Such a solution is therefore still too centralized. And here too is one of the technical problems that the present invention proposes to resolve.

Finally, there are also kernel structuring proposals for single-core processors, such as that described in the patent EP 1 337 919 B1, which disclose the organization of a kernel in a micro-kernel and a system layer making it possible to coordinate on a single core a deterministic execution of the tasks. This patent does not indicate how to proceed with an advantageous partitioning of the kernel between different cores of an MPSoC architecture. And that is one of the aims of the present invention.

SUMMARY OF THE INVENTION

The aim of the invention is notably to provide a solution to the abovementioned drawbacks by proposing an optimized partitioning of the micro-kernel on the processing cores. The system functions are thus assigned on the basis of an optimum distribution of the pacing and time management functions, such that each core handles only some of the processing functions of the micro-kernel. A core is then dedicated to the execution of the tasks, whereas the second core behaves as a partial controller of the first and an interrupt manager. The present invention proposes to structure the micro-kernel in two distinct and complementary parts that are:

a control-oriented part handling the capture of the system interrupts relating to the upkeep of the time base and the updating of the scheduling lists, and, a computation-oriented part relating to the execution of the time-paced tasks. This part of the micro-kernel then handles the switching of the tasks in accordance with the scheduling policy implemented and driven by the "control" part.

This structuring of the micro-kernel facilitates the effective coexistence of tasks deriving:

from an ET ("Event Triggered") island which gathers the input-output activities triggered by interrupts in which the interrupt-conditioned tasks are executed;

from a TT ("Time Triggered") island which gathers the time-paced activities in which the real-time tasks are executed.

The TT island is thus assigned to the computation-oriented part, whereas the control-oriented part of the micro-kernel, dedicated to the taking of system interrupts, can also handle the capture and processing of the input/out application interrupts of the ET island. This offers the advantage of partitioning the two islands on two different cores, but also of granting a maximum of computation resources to the tasks deriving from the TT island, these tasks not being subject to switching because of the activations of the tasks of the ET island. Hereinafter in the document, the "computation" part of the micro-kernel is called "mN-TT micro-kernel" or "mN-TT part" whereas the "control" part of the micro-kernel is called "mN-ET micro-kernel" or "mN-ET part".

To this end, the subject of the invention is notably an information processing system comprising two processing cores. The execution of an application by the system includes the execution of application tasks and the execution of system tasks, the system comprises a micro-kernel executing the system tasks which are directly linked to hardware resources in which:

a computation part mN-TT of the micro-kernel on a first core A executing system tasks relating to the switching of the tasks on the core A, including the updating for each task of a state indicating whether said task is executable or not, said state being included in an execution context associated with said task and gathering execution data for said task, said state being able to take:
a value indicating that the task is ready;
of a value indicating that the task is idle;
of a value indicating that the task is errored;

a control part mN-ET of the micro-kernel on a second core O executing application tasks triggered by input/output interrupts and executing system tasks relating to the control of the task allocation order on the core A, said system tasks including the management:
of an ordered list of the tasks that are ready, and/or;
of an ordered list of the tasks that are idle, and/or;
of a list of the tasks that are errored;

the processing system being characterized in that the system tasks executed by the core A relating to the switching of the tasks include the updating in the execution context of each task:
of an execution start limit time at the earliest and/or an execution end limit time at the latest;
of a remaining execution time quota;

so that the core O orders the tasks in the list of the tasks that are ready in an order that makes it possible to execute each task in accordance with its execution limit times and in accordance with its execution time quota.

Advantageously, the system tasks executed by the mN-TT part of the micro-kernel relating to the switching of the tasks can include, on reception of an interrupt by the core A:
the loading of the execution context of a task from the tasks that are ready;
the triggering of the execution of said task.

Advantageously, on reception of an interrupt, the mN-TT part of the micro-kernel can load the execution context of the first task into the list of the tasks that are ready.

If necessary, it is possible to generate the interrupt with a timer implemented by the mN-ET part of the micro-kernel. The timer can be paced by a quartz crystal clock, so as to trigger the execution of real-time application tasks by the mN-TT part of the micro-kernel.

Advantageously, each core can execute the system tasks relating to the communications between the tasks that are specific to them.

Advantageously, the system may comprise a shared memory space and a set of interrupts so that the cores interact.

In one embodiment, the cores may be processors of different types. The processors may be implemented on a chip.

Other main advantages of the invention are that the partitioning of the micro-kernel makes it possible to relieve the computation core of having to take into account fast input-output interrupt-conditioned processing functions and certain system processing functions, thus avoiding frequent changes of context between the computation tasks and the interrupt-conditioned processing functions. Implemented on a chip, the achievable performance levels are improved while guaranteeing a high level of security between the different acquisition or computation processing functions on the multi-core hardware architecture. The invention also makes it possible to have time-paced computation processing functions and routines associated with the event-paced inputs-outputs coexist effectively.

BRIEF DESCRIPTION OF THE DRAWINGS

Other features and advantages of the invention will become apparent from the following description, given in light of the appended drawings which represent.

DETAILED DESCRIPTION

Figure 1:
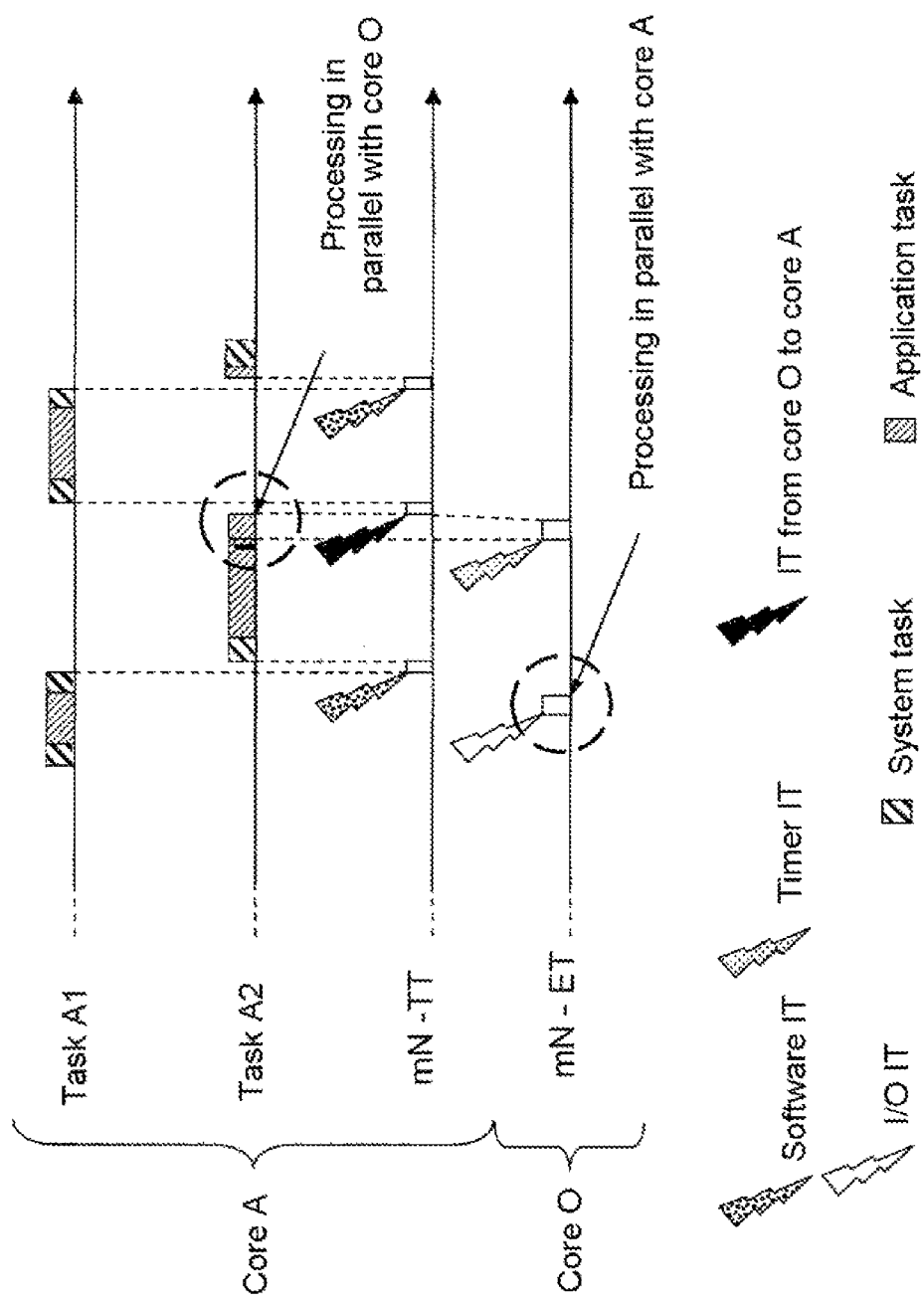
FIG. 1, by a timing diagram, an illustration of an exemplary distribution according to the invention of the activities of a micro-kernel on two processing cores.

According to the invention, the mN-ET and mN-TT parts of the micro-kernel share a single set of scheduling lists for tasks that are ready/idle/errored, for which the order within the lists is maintained by the mN-ET part and the content of each element of the lists is maintained by the mN-TT part. The mN-TT micro-kernel directly consults the lists without requiring a local scheduling. The processing functions of the mN-TT and mN-ET parts also give rise to asynchronous interactions via software interrupts. In practice, as soon as one of the parts has finished a system processing function that has modified the state of the shared information, a software interrupt is raised intended for the other part to announce the fact to it. The sending part then continues its execution, to execute remaining system or application tasks in parallel. Thus, when the mN-ET part modifies the list of the tasks that are ready, it announces the fact to the mN-TT part, then it continues with its execution. Conversely, the mN-TT part announces to the mN-ET part the change of state of a task, which requires an updating of the lists, then it continues with its execution by immediately handing control to the next task that is ready. The micro-kernel is thus distributed as a whole with an asynchronous interactions method that does not currently exist.

In the present exemplary embodiment, the mN-TT part may be hosted on a core A, also called mN-TT core, offering a maximum of computation capabilities. Whereas the mN-ET part may be placed on a core O, also called mN-ET core, that can be optimized for the taking of interrupts. For example, the Freescale S12XE (registered trademark) architecture lends itself well to this distribution, the mN-TT part being placed on the CISC core and the mN-ET part being placed on the RISC core. Thus, the application tasks can be executed both in user mode (corresponding to the application or functional processing functions of the system) and in supervisor mode (corresponding to the system processing functions dedicated to the task comprising the control of its logical and temporal trend, as well as the management of its inter-task communications). The system calls are thus kept on the core which executes the application task. The invention makes it possible to implement communications between the ET and TT tasks without requiring blocking synchronization mechanisms.

As indicated, the present application describes an information processing system which makes it possible to execute effectively, that is to say in a secure and deterministic manner, a plurality of time-paced tasks and specific processing functions linked to fast inputs/outputs. The invention is based on an effective distribution of the various low-level functions of the kernel on the core A and the core O. To define this effective distribution according to the invention, two distinct parts within the kernel in the present exemplary embodiment have been distinguished:

- a system layer which may be a generic layer for managing the pacing by a timer and communications between the tasks: it then contains the description of the pacing by the timer of the execution of the tasks, and it may also make it possible to implement the communications between the tasks;
- a micro-kernel which is a layer managing the allocation of the processing resource, the management of exceptions and real-time time-stamping.

For example, the timer may be paced by a quartz crystal clock, so as to trigger the execution by the core A of real-time tasks. The core A is dedicated to the execution of the real-time tasks of the TT island, but it also implements the functions of the mN-TT part of the micro-kernel. The core O is dedicated to the execution of the interrupt-conditioned processing functions of the ET island, but it also implements the functions of the mN-ET part of the micro-kernel relating to the control of the order of allocation of the processing functions to the computation core. The mN-ET part of the micro-kernel also triggers, in the mN-TT part, functions of the micro-kernel relating to the monitoring of allocation times. This is one of the key principles of the invention, namely the use of the core O to determine and monitor the manner in which the core A is used by the real-time tasks of an application. The invention makes it possible to gain in performance, by relieving the core A of the system activities linked to the updating of the list of tasks (tasks that are ready, tasks that are idle and tasks that are errored) in the present exemplary embodiment, as well as by relieving it of the system activities linked to the choice of allocation of the computation core from the tasks that are ready. The invention makes it possible to distribute over both cores the system activities that implement the allocation of the tasks in a non-blocking manner.

In the present exemplary embodiment, the mN-TT part of the micro-kernel on the core A is responsible for managing the switching of tasks on the core A. It may also concern updating the content of the execution contexts of the tasks, for example in terms of effective execution time and remaining quota (a quota is an upper limit of execution time reserved for the execution of the task concerned). It may also concern triggering the execution of the tasks on interrupt from the core O managing the timer, for example by virtue of the earliest start time or timeouts known to the compilation. When such a task comes to the end of its application processing function, it hands control to the mN-TT micro-kernel on the core A by virtue of a so-called "software" interrupt, either to push back its timeout as late as possible or to adjust its next wake-up time.

In the present exemplary embodiment, the mN-ET part of the micro-kernel is advantageously responsible for taking into account the updates of the task contexts and for accordingly ordering the following lists of tasks: a list of the tasks that are ready, a list of the tasks that are idle and a list of the tasks that are errored. Thus, the mN-TT part of the micro-kernel can advantageously grant its CPU (Central Processing Unit) in the order of the tasks in a list of the tasks that are ready, and compute the effective execution time of each task. The mN-ET part of the micro-kernel may also be responsible for maintaining the current time, useful to the timer-pacing system for waking up the tasks. It may also activate the effective execution time controls on the computation core. It may also trigger the execution of the input-output interrupt-conditioned tasks. The part of the kernel on the core O may also time-stamp their results to make them available to the application tasks of the core A.

FIG. 1 illustrates an exemplary distribution according to the invention of the activities of a micro-kernel (µkernel) on a core O and a core A, during the execution of application tasks A1 and A2 in the TT island. As illustrated by FIG. 1, the execution of the micro-kernel can be triggered on the occurrence of an interrupt (IT) coming from the timer (timer IT), which corresponds to the waking-up of the task. The execution of the micro-kernel can also be triggered on the occurrence of a software interrupt (software IT). It can finally be triggered on the occurrence of an interrupt linked to a fast input-output (I/O IT). Since the execution of the micro-kernel is distributed over both cores, the inputs in the micro-kernel following timer interrupts and following input-output interrupts can be done directly on the core O. As detailed hereinafter, the inputs in the micro-kernel following software interrupts are distributed between the core A in which the tasks are executed and the core O. One major benefit from the partitioning of the micro-kernel according to the invention is that it enables the core A to anticipate the execution of a task. In practice, when a first task has finished its processing before the occurrence of the timer interrupt, this means that the time allotted but not consumed is available for other tasks that are ready in accordance with their time parameters. This then amounts to consuming all the remaining processing time that was assigned to the first task by executing other tasks that are ready. This also avoids both waiting for the computation of the new scheduling of the tasks (performed by the mN-TT part on the core O) and waiting in a blocking manner for this operation to have been completed. Since the termination of each task corresponds to a change of state requiring a re-scheduling of the execution lists, there are several ways of coordinating the two cores in order to announce this change of state. The first method consists in waiting for the occurrence of the timer interrupt which is then tantamount to processing all the changes of states of all the tasks executed and terminated. The second method consists in having an associated additional input in the mN-ET micro-kernel, triggered by an interrupt originating from the mN-TT part of the micro-kernel. This has the effect of inhibiting the next timer interrupt and anticipating the updating of the scheduling lists. It is the first change of state announcement coordination method that has been retained in the following detailed description. It should be noted that, in the present exemplary embodiment, a task is always well executed between its two time limits and in accordance with its time quota.

In the present exemplary embodiment, the mN-ET part of the micro-kernel being executed asynchronously on the occurrence of interrupts from the timer, an additional input in the mN-TT part of the micro-kernel on the core A advantageously makes it possible to signal a change in the list of tasks to be taken into account or a quota control to be performed. Since the control concerning the effective execution time by virtue of the quota is then partly delegated to the mN-TT micro-kernel, it is then necessary to have an associated additional input in the mN-ET part of the micro-kernel, triggered by an interrupt originating from the mN-TT part of the micro-kernel, to signal to it the result of the control concerning the effective execution time. In another embodiment, in order to avoid managing differences between the quota measurements on the core A and on the core O, the interrupts for quota controls can be completely managed by the core A.

Following the principles stated hereinabove, there are a number of ways of coordinating the two cores in relation to the effective execution time control activities. A first method consists in putting in place a single interrupt round trip between the two cores: the timer triggers a quota control concerning the mN-ET part of the micro-kernel which in turn triggers an interrupt toward the core A and then a second interrupt is triggered by the mN-TT micro-kernel toward the core O when the control is carried out. This has the advantage of saving in hardware resources, the timer being able to manage both the waking up of a task and the quota control. A second method without round trip can be defined: the timer this time initiates the control for the attention of the mN-TT micro-kernel which, once the quota computation is finished, triggers an interrupt toward the core O to announce a change of state. With this method, the overall number of interrupts is reduced but may prove costly in terms of switching times, for example when intermediate interrupts are to be managed. It is the first method for coordinating the quota control that has been retained in the following detailed description.

In the present exemplary embodiment, a state variable of the micro-kernel, called natInt is therefore systematically positioned at the output of all the processing functions of the mN-ET part of the micro-kernel, in order to know the nature of the next expected interrupt. It is specific to the mN-ET micro-kernel. For example, when natInt is 0, this means that the expected interrupt is the one originating from the core A.

The associated processing functions from the core O may advantageously comprise the updating of the list of the tasks that are ready, of the tasks that are idle and of the tasks that are errored, as well as the arming of the next timer interrupt. For example, when natInt is 1, this means that the expected interrupt is a timer interrupt for controlling the effective execution time of the activated task. The processing functions associated with the mN-ET micro-kernel comprise the triggering of an interrupt toward the core A for effective control. For example, when natint is 2, this means that the expected interrupt is a timer interrupt for waking up a task that is idle. The processing functions associated with the mN-ET micro-kernel may advantageously comprise the updating of the list of the tasks that are ready, of the tasks that are idle and of the tasks that are errored, the triggering of an interrupt toward the core A, as well as the arming of the next timer interrupt.

In the present exemplary embodiment, a state variable of the micro-kernel called natAlert is therefore positioned before any interrupt from the core O toward the core A is triggered. It is updated by the mN-ET part of the micro-kernel and is consulted by the mN-TT part of the micro-kernel. For example, when natAlert is 0, this means that the interrupt from the core A corresponds to a task wake-up. The processing functions associated with the mN-TT part of the micro-kernel comprise the taking into account of the new lists. For example, when NatAlert is 1, this means that the interrupt originating from the core O corresponds to a control of the effective execution time. Advantageously, the associated processing functions on the core A may comprise the control of the effective execution time of the activated task, then the positioning of the state of the task, then the triggering of the interrupt from the computation core toward the core O. FIG. 1 clearly shows the parallel processing functions performed by the cores A and O.

Figure 2:
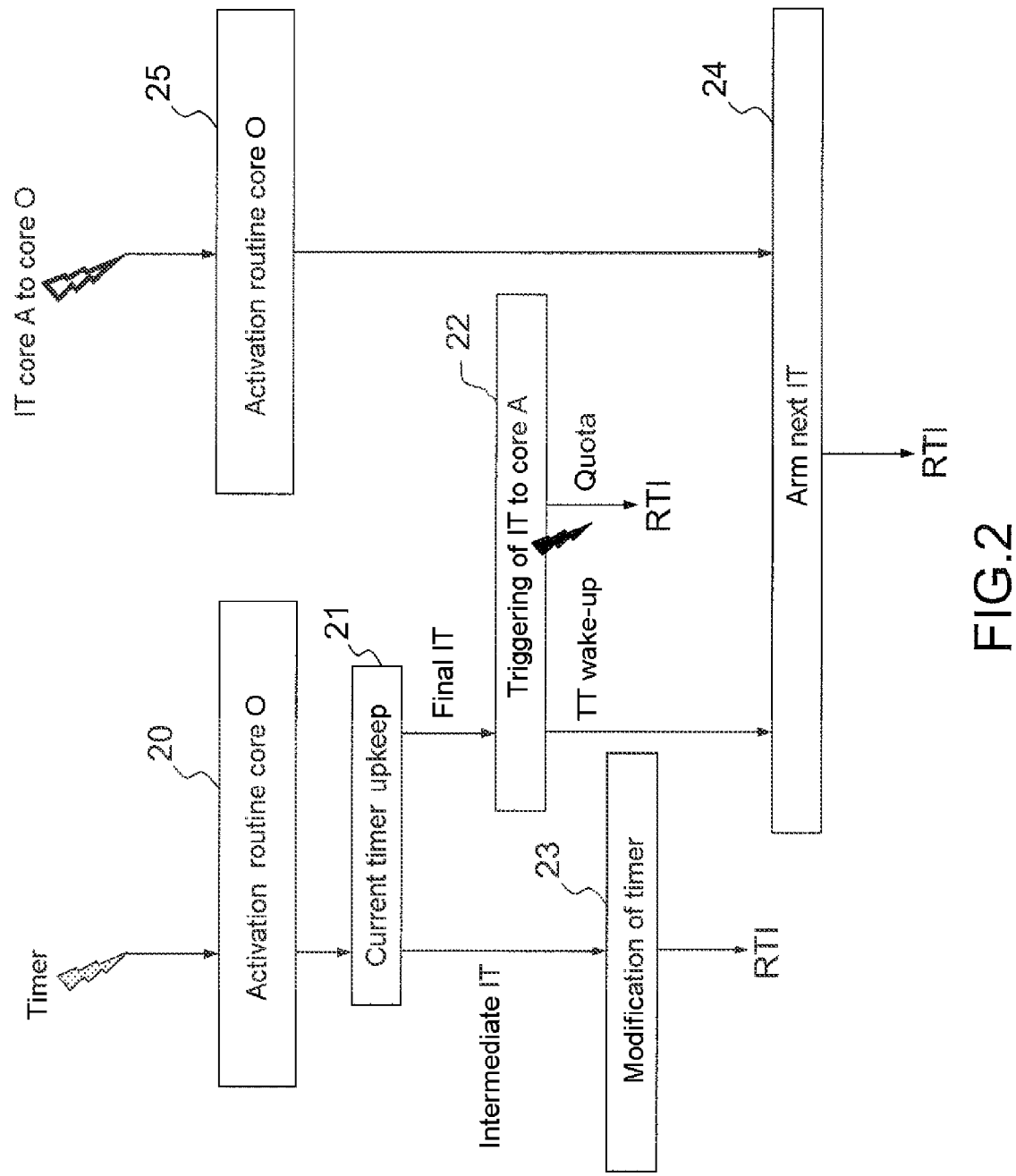
FIG. 2, by a functional block diagram, an illustration of an example according to the invention of interrupts intended for the mN-ET part of the micro-kernel.

FIG. 2 illustrates an example according to the invention of an interrupt coming from the timer, processed by the core O. This interrupt may advantageously be implemented by the mN-ET part of the micro-kernel, as illustrated by a block 20, at each termination of the associated routine. It therefore makes it possible to monitor the time trend of the processing functions on the core A, as illustrated by a block 21. The timer interrupt then corresponds either to the waking up by the timer of a task ("TT wake-up"), or to controlling that the time constraints of the activated task are observed, in terms of quota or timeout for example.

The wake-up times or the time constraints, in terms of timeout or of quota, are expressed as timer pacing system times. They may be coded on a certain number of bits, for example on 32 bits. In the case where the timer does not allow for the direct expression of a time constraint, that is to say, when the next interrupt to be armed, as illustrated by a block 24, corresponds to a time constraint whose value is greater than the capacity of the timer, the micro-kernel may then be responsible for managing the transcription of the timer pacing system times into the time base of the timer. In this case, the mN-ET part of the micro-kernel manages intermediate interrupts, as illustrated by a block 23, to count down the time before the occurrence of the latest interrupt, which corresponds to the final interrupt of the time constraint concerned. The final interrupt leads to the processing function for updating the list of tasks that are ready and the list of the tasks that are idle, then to the triggering of an interrupt on the core A, as illustrated by a block 22, in order to make it take into account the time event for which the micro-kernel was activated, according to the natint value (1 or 2)

Since the mN-ET micro-kernel is the manager of the timer interrupt in the present exemplary embodiment, it is then responsible for scheduling and controlling the allocation of the core A to the tasks. Thus, when the list of the contexts that are ready is updated or when the quota control interrupt is produced, it interrupts the core A using a software interrupt and indicates to it the nature of its intervention, by virtue of natAlert. The mN-TT part of the micro-kernel may then advantageously perform the updating and the controlling of the quota of the active task, then, possibly, undertake the context switching by ascertaining the new task that is ready and by loading its execution context, as illustrated by a block 33 in FIG. 3. Then, when the end-of-quota-control interrupt is processed by the mN-ET micro-kernel, as illustrated by a block 25, the next interrupt associated with the pacing is armed (block 24). In FIG. 2 and subsequent figures, the acronym "RTI" represents the "ReTurn from Interrupt" instruction.

Figure 3:
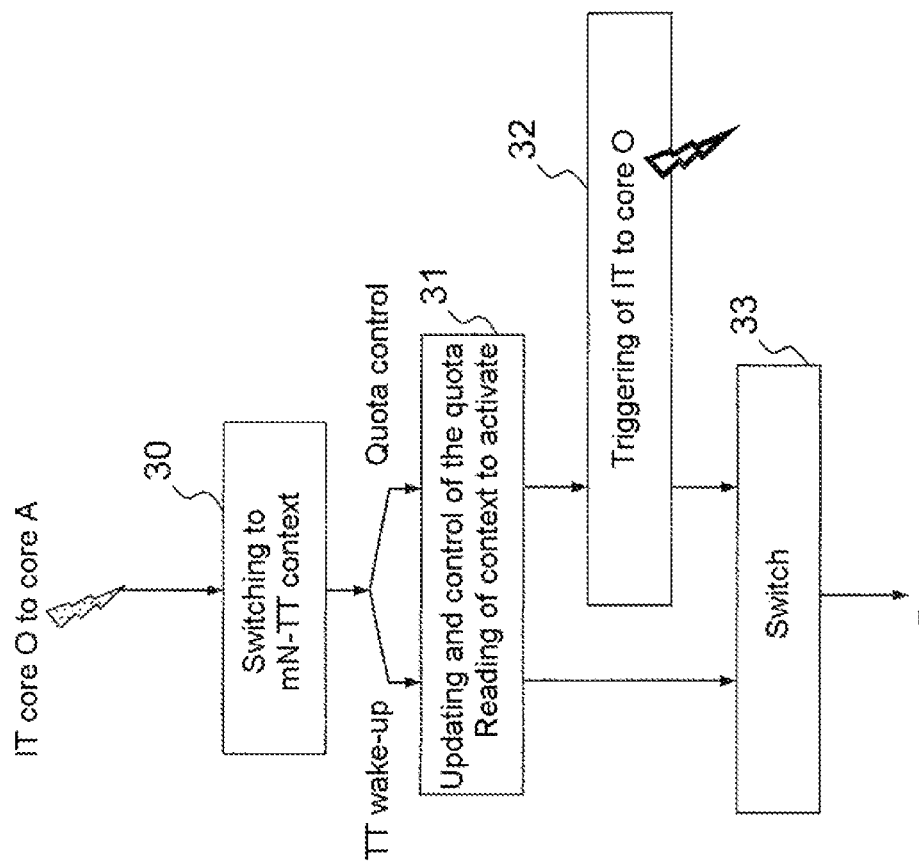
FIG. 3, by a functional block diagram, an illustration of an example according to the invention of software interrupt coming from the mN-ET part and intended for the mN-TT part of the micro-kernel.

As illustrated by blocks 30 and 31 in FIG. 3, in the present exemplary embodiment, when it concerns a quota control request, the mN-ET micro-kernel awaits the result of the quota analysis on the part of the mN-TT micro-kernel. This wait is non-blocking, the mN-ET micro-kernel continuing its processing functions until the mN-TT micro-kernel announces to it the end of this processing function by in its turn triggering an interrupt for its attention, as illustrated by a block 32. From there, as illustrated in FIG. 2 by the block 25 and the block 24, the mN-ET part of the micro-kernel can then re-activate the next timer interrupt. Whether this is for a quota control or for a wake-up by the timer (change in the list of tasks that are ready, that are idle or that are errored), the mN-TT part of the micro-kernel ascertains the new task that is ready and loads its execution context (block 33).

Figure 4:
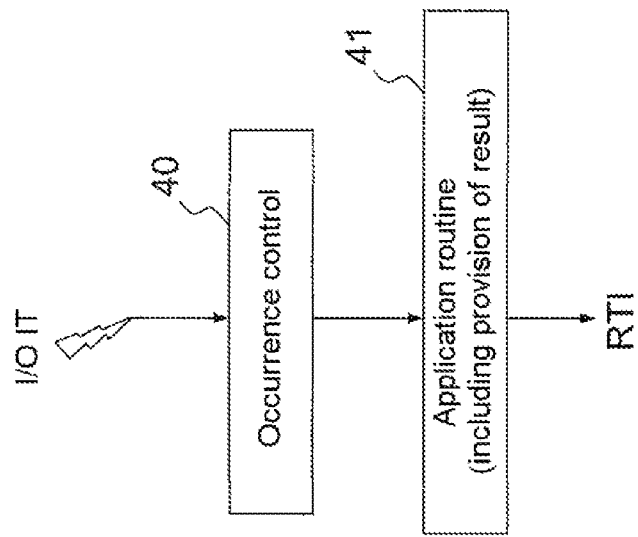
FIG. 4, by a functional block diagram, an illustration of an example according to the invention of input-output interrupt intended for the mN-ET part of the micro-kernel.

As illustrated by FIG. 4, the mN-ET micro-kernel may advantageously implement the manager of the input/output interrupts. It may then be responsible for the activation of a routine associated with the input/output interrupt. This routine may comprise a generic initial part for controlling the occurrence of the interrupt, as illustrated by a block 40, and a specific application processing part including the possibility of signaling that the result that has been generated and that is linked to this input/output may be made available by the core to the tasks on the core A, as illustrated by a block 41. For example, it may advantageously be put in a shared memory area between the two cores for example, which may also share a set of specific interrupts for interacting. The strategy for controlling the occurrence of interrupts depends on the targeted industrial domain and on the type of monitoring to be put in place. This strategy may, for example, exploit an authorized maximum number of input/output interrupts or an authorized minimum or maximum time between two input/output interrupts. In cases where one of these criteria is not observed, the control must also specify the associated "failure" management strategy. This strategy may also be of different kinds, possibly ranging from the resetting to zero of the management module for this input/output to the temporary or definitive inhibition of its operation. The data generated is made available by the kernel in the application processing function by the call to a system function of the mN-ET part. The purpose of this function is to time-stamp the result and associate with this assembly an index signaling its position in a buffer available to the kernel on the core A side. The buffer is dimensioned according to the occurrences of expected input/output interrupts and according to the use of these data by the associated application real-time task. It should be noted that the time-stamping of the result generated by the kernel should be atomic relative to the maintenance of the current time via the timer interrupt.

Figure 5:
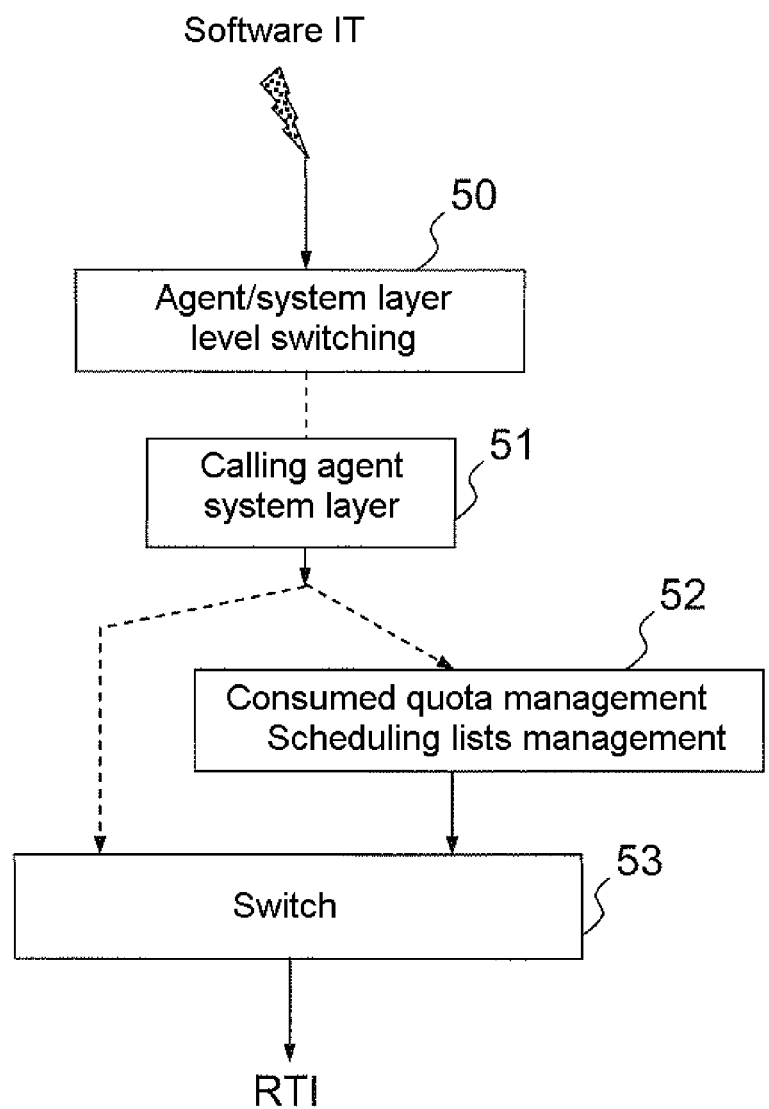
FIG. 5, by a functional block diagram, an illustration of an example according to the invention of software interrupt from the mN-TT part intended for the mN-TT part of the micro-kernel.

As illustrated by FIG. 5, a software interrupt originating from a task is triggered to signal a system call, for example, the arrival of the execution graph intended for a node. In the present exemplary embodiment, the mN-TT micro-kernel may then make modifications to the execution context, as illustrated by a block 50, to allow for the execution of the system layer of the calling task, as illustrated by a block 51. While it is being processed, the system layer may be required to modify the time constraints of the task in accordance with its execution graph. This operation then leads the system layer to undertake a management of the consumed quota, as illustrated by a block 52, then may, if necessary, lead the mN-TT micro-kernel to perform a task switching on the core A, as illustrated by a block 53. A function may set a state variable in the communication area and an indicator associated with the source input, then transfer the arguments and the times of seizure and of release of the computation core in the context of the task that was being executed. Then, there may a call to the switching module to activate the next task that is ready. The consumed CPU quota is evaluated by computing the difference between the time at which the task abandons the CPU, or the time at which said task is removed from it, and the time at which said task was given to it. The computation is done by the mN-ET micro-kernel on the basis of the information supplied by the mN-TT part of the micro-kernel. In practice, upon the preemption of a task that does not lead to a change of state of said task, which therefore remains activatable, the associated consumed quota information contained in the context of the task may advantageously be updated by the computation core.

In order to be synchronized, the two parts of the micro-kernel share data such as that defined, for example, in table 1 below. However, there is only a single writer for a datum.

TABLE 1 example of synchronization data according to the invention

| Data | Writer | |
|---|---|---|
| natAlert | mN-ET micro-kernel | Nature of the incoming interrupt on the core A: 0 => task wake-up; 1 => quota control. |
| contexPret | mN-ET micro-kernel | List of the tasks that are ready |
| contexDerout | mN-ET micro-kernel | List of the tasks that are errored |
| contexRepos | mN-ET micro-kernel | List of the tasks that are idle |
| heureCompt0 | mN-ET micro-kernel | Value of the current time of the timer (when the counter of the associated timer changes to 0) |

The structure of the task execution contexts uses fields like those defined by way of example in table 2 below. The content of these fields is updated by a single writer, which may be either the mN-ET micro-kernel or the mN-TT micro-kernel. It should be noted that, in the present exemplary embodiment, the mN-TT micro-kernel advantageously updates a "state" variable which indicates notably whether an activatable task that is ready changes to idle or to errored. The mN-ET part of the micro-kernel is the only one able to make it revert to the activatable state when the list of tasks is updated.

TABLE 2 example of context structure according to the invention

| Field | Writer | Description |
|---|---|---|
| suiv | mN-ET micro-kernel | For management of the list of contexts |
| ag | Static constant datum | Pointer to the static descriptor of the task |
| datPret | mN-ET micro-kernel | Effective activation time |
| datFin | mN-ET micro-kernel | Effective deactivation time |
| quota | mN-ET micro-kernel | Effective quota for the current application task |
| datPretS | mN-TT micro-kernel | New earliest activation time |
| datFinS | mN-TT micro-kernel | New latest end time |
| quotaS | mN-TT micro-kernel | New value of the quota for the application task |
| quotaM | mN-TT micro-kernel | New value of the quota having to remain on completion of the processing of the application task |
| datOcc | mN-TT micro-kernel | CPU occupancy start time |
| datLib | mN-TT micro-kernel | CPU release time |
| etat | mN-TT micro-kernel and mN-ET micro-kernel | Task state: PRETREPOS: task idle, reposition the execution window; DATETARD: push back the limit time; DEROUT: task errored; ACTIVABLE: task ready, able to be executed. |

In the present exemplary embodiment, the contexPret list is accessed in read mode by the mN-TT micro-kernel and maintained by the mN-ET micro-kernel, that is to say, accessed in read and in write modes. Notably, the mN-TT micro-kernel reads the contexPret list:

after an interrupt coming from the core O to control the quota or for a wake-up. For a quota control, the head of the contexPret list is compared to the task currently executing to determine whether or not the quota has been exceeded. For a wake-up, the head of the contexPret list is accessed to make it the new task to be executed;

on the system input via a software interrupt from the system layer, to modify the time constraints. Only the next pointer of the task currently executing is then read for the continuation of the execution.

On the mN-ET micro-kernel side, the insertion of a context C between two contexts B and D is done by first modifying the one following C (which will be equal to D), then by modifying the one following B (which will be equal to C).

In the present exemplary embodiment, the extraction of the contexts may be performed by considering the contexts which are no longer activatable. The control therefore uses contexPret on the first activatable task (the latter being excluded). The extractions are invisible to the core A, because, if the context is no longer activatable, this means that the core A has already executed them, therefore the task currently executing on the core A is equal to the first activatable task or to one of its following tasks. It will therefore no longer return to it.

Regarding the management of the DATETARD state, it should be noted that the aim of this operation is to push back the limit time of a context during its execution. When this limit time deferment takes place, the mN-TT micro-kernel goes onto the next one of this context. Now, if the limit time is still upstream of the next one despite this deferment, the task will not be reexecutable until the next interrupt originating from the core O with natAlert set to 0.

To make the result of the application routines for managing input/output interrupts available on the core O, as explained previously, a buffer is made available in read mode to the system layer of a computation task. The indexing in this table enables the system layer on the core A side to maintain and identify the input/output results returned or not returned by the task.

Figure 6:
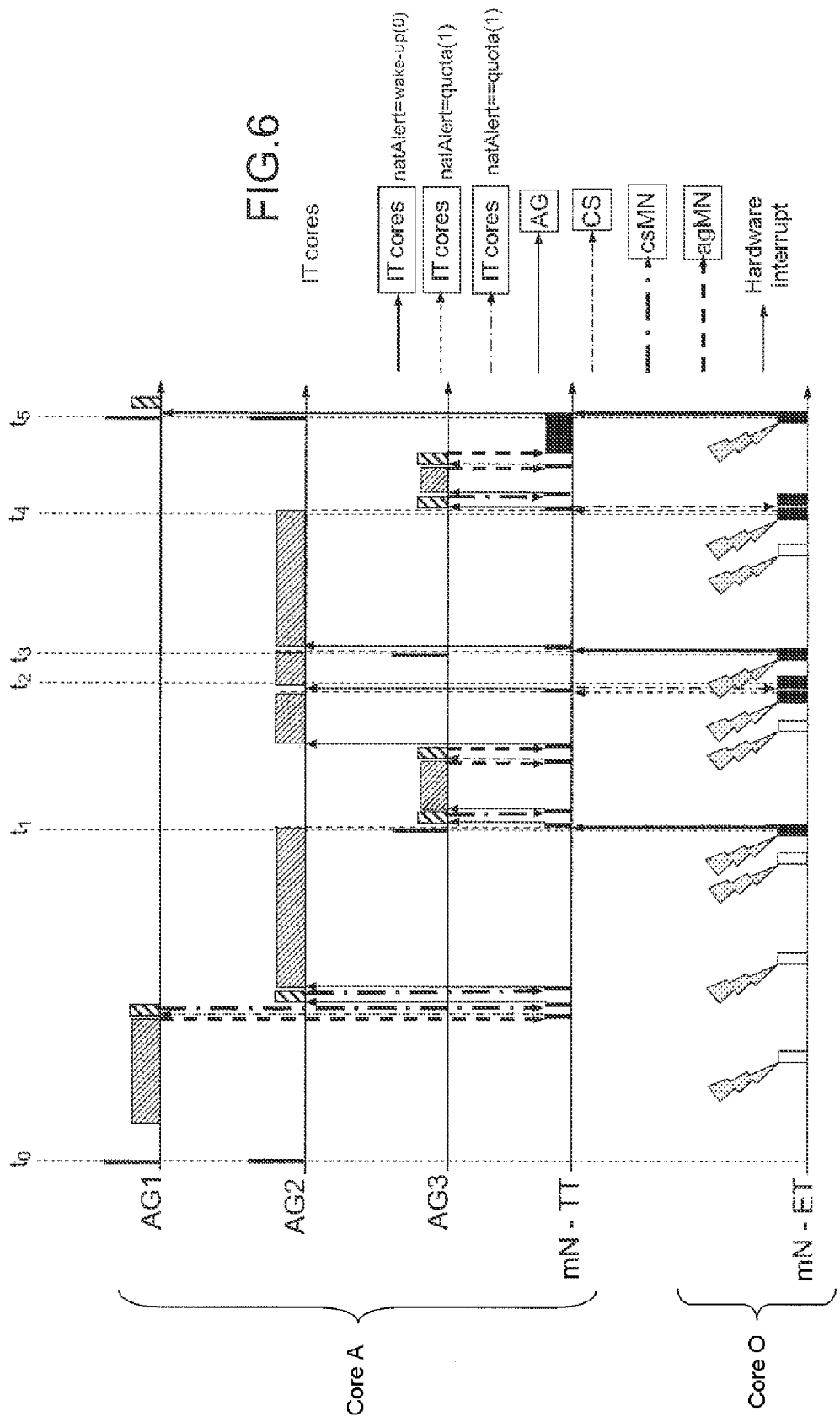
FIG. 6, by a timing diagram, an illustration of an example of an operating scenario of two cores in parallel according to the invention.

FIG. 6 illustrates an exemplary operating scenario according to the invention for two parallel cores, the acronym CS standing for "system layer", agMN standing for "change from application task mode (agent—ag) to micro-kernel (MN) and csMN standing for "change from system task mode (system layer—cs) to micro-kernel (MN)".

At an instant $t_0$:

tasks AG1 and AG2 are in the list of the tasks that are ready;

the task AG1 is the one that is currently executing and its quota goes beyond an instant $t_1$;

the next final interrupt is, for the instant $t_1$, wake-up time by the timer for a task AG3;

the task AG3 is in the list of the tasks that are idle.

Between the instant $t_0$ and the instant $t_1$:

there are three intermediate interrupts on O;

the task AG1 finishes its basic activity before its quota is reached. The mN-TT micro-kernel switches and executes the task AG2 with the quota for the task AG1.

At the instant $t_1$:

the interrupt by the timer arrives to wake up the task AG3;

the mN-ET micro-kernel places the task AG1 in the list of the tasks that are idle, places the task AG3 at the head of the list of the tasks that are ready, arms the timer with the quota for the task AG3 which corresponds to an instant $t_2$, positions natAlert at 0 and notifies, by an interrupt to the mN-TT micro-kernel, new lists of tasks to be taken into account. The mN-TT micro-kernel then performs the quota control regarding the task AG2 then hands control to the task AG3.

Between the instant $t_1$ and the instant $t_2$:

there is an intermediate interrupt on O;

the task AG3 finishes its basic activity before its quota is reached. The mN-TT micro-kernel switches then continues to execute the task AG2 with the quota for the task AG3.

At the instant $t_2$:

the interrupt by the timer arrives for the quota control for the task AG3;

the mN-ET micro-kernel positions natAlert at 1, notifies, by an interrupt to the mN-TT micro-kernel, the quota controls to be performed;

the core A changes to the micro-kernel mode on receiving the interrupt from the mN-ET micro-kernel and modifies the content of the context of the task currently executing for the quota control (the task AG3 had finished its activity), sends an interrupt to the mN-ET micro-kernel to notify the updates then returns control to the only task that is ready and activatable, the task AG2;

the mN-ET micro-kernel places the task AG3 in the list of the tasks that are idle and arms the timer to wake up the task AG3 (closer than the end of the quota remaining to AG2) at an instant $t_3$.

At the instant $t_3$:

the timer interrupt arrives to wake up the task AG3;

the mN-ET micro-kernel places the task AG3 in the list of the tasks that are ready (after the task AG2), arms the timer with the remaining quota authorized for the task AG2 which corresponds to an instant $t_4$, positions natAlert at 0 and sends an interrupt to the mN-TT micro-kernel to notify the new lists of tasks to be taken into account. The mN-TT micro-kernel then performs the quota control concerning the task AG2 then hands control to the task AG3.

Between the instant $t_3$ and the instant $t_4$:
there is an intermediate interrupt on the core O.
At the instant $t_4$:
the timer interrupt arrives for the quota control for the task AG2;
the mN-ET micro-kernel positions natAlert at 1, sends an interrupt to the mN-TT micro-kernel to notify the quota controls to be performed;
the core A changes to micro-kernel mode on receiving the interrupt from the core O and modifies the content of the context of the task currently executing (the task AG2 has exceeded its quota), sends an interrupt to the mN-ET micro-kernel to notify the updates then hands control to the only task that is ready and activatable, the task AG3;
the mN-ET micro-kernel places the task AG2 in the list of the tasks that are errored and arms the timer to wake up the task AG1 (closer than the end of the quota remaining to AG3) at an instant $t_5$.

Between the instant $t_4$ and the instant $t_5$:
the task AG3 finishes its basic activity before its quota is reached. The micro-kernel of the core A changes to idle mode.

At the instant $t_5$:
the timer interrupt arrives to wake up the task AG1;
the mN-ET micro-kernel places the task AG3 in the list of the tasks that are idle and the task AG1 in the list of the tasks that are ready, arms the timer with the quota for the task AG1, positions natAlert at 0 and sends an interrupt to the mN-TT micro-kernel to notify the new lists of tasks to be taken into account.

By transferring to a core dedicated to control, a subset of kernel functions that are task scheduling, time management and the management of interrupt-conditioned inputs-outputs, the invention described previously makes it possible to fully exploit and make the best use of the effective parallelism of a multicore hardware architecture. The asymmetrical distribution of the functions of the micro-kernel in two parts MN-TT and MN-ET proposed by the invention also makes it possible to secure the real-time execution of time-paced computation tasks and the execution of the routines conditioned by input-output interrupts. In practice, the asymmetrical distribution of the functions of the micro-kernel proposed by the invention ensures a spatial and temporal separation between the ET island executed on the core O and the TT island or islands executed on a core A. Thus, the management of the interrupt-conditioned processing functions is not attributed to the core A, notably the input-output processing functions, in no circumstances disrupting the performance levels that can be achieved by the computation tasks, and vice versa. From the memory point of view, the memory placements and, possibly, the memory protections prevent the core O from accessing the memory areas of the computation tasks. The controls concerning the occurrence of input-output interrupts on the core O and the controls concerning effective execution times on the computation core or cores make it possible to monitor the interrupts and to detect any time-related behavior anomalies.

Other main advantages of the invention described above are that it allows for the efficient, controlled and secure execution of a complete embedded real-time system, for applications in the automobile field for example. In practice, the invention makes it possible to make the best use of the embedded hardware architectures, allowing a very high degree of integration in terms of numbers of tasks or of functionalities per processor. Since the associated multitasking execution method incorporates the coordination of the cores, the invention also makes it possible to execute, in a manner that is transparent to the developer, on multicore architectures, an application comprising a set of tasks and routines conditioned by input-output interrupts. The developer in fact no longer has to concern himself with the location of the tasks or of the routines by virtue of the interfaces and the shared elements in the kernel which have been defined to manage its asymmetrical partitioning on the cores.

The invention claimed is:

1. An information processing system comprising a plurality of processing cores for executing tasks within a plurality of parts in parallel, said processing cores comprising: two processing cores configured to execute an application comprising a set of tasks; a micro-kernel configured to execute system functions, which are directly linked to hardware resources, the micro-kernel comprising a computation part and a control part of the plurality of parts, wherein: the computation part of the micro-kernel is hosted on a first core of the two processing cores and is configured to execute system functions for managing switching of the execution context of tasks on the first core, the system functions including, for each task, updating of a state indicating whether said task is executable, said state being included in an execution context associated with said task, said execution context gathering execution data for said task, said state switching between:
  a value indicating that the task is ready;
  a value indicating that the task is idle; and
  a value indicating that the task is errored;
  the control part of the micro-kernel is hosted on a second core of the two processing cores and is configured to execute tasks triggered by input/output interrupts and to execute system functions relating to control of the task allocation order on the first core, said system functions including management of at least one of the following set of lists of tasks:
  of an ordered list of the tasks that are ready;
  of an ordered list of the tasks that are idle; and
  of a list of the tasks that are errored;
  the computation part and the control part of the micro-kernel share the set of the lists of tasks, where the order within the lists is maintained by the control part and the content of each element of the lists is maintained by the computation part; and
  the second core orders the tasks in the ordered list of the tasks that are ready such that each task is executed in accordance with an execution limit time of each task and in accordance with an execution time quota of each task, wherein the execution limit time comprises a range of time between which execution of a task is to begin and end, and wherein the execution time quota specifies a limit of execution time reserved for the execution of each task,
  in response to completion of a system function that results in modification of the shared list of the tasks by one of the computation part and the control part, said part that modifies being configured to notify the completion of said system function to the other part, and said part that modifies being further configured to continue its execution of remaining system or application tasks in parallel with said notification.

2. The information processing system as claimed in claim 1, wherein the system functions executed by the computation part of the micro-kernel include, on reception of an interrupt by the first core: loading of the execution context of a first task from the tasks that are ready; and triggering of the execution of said first task.

3. The information processing system as claimed in claim 2, wherein, on reception of an interrupt, the computation part of the micro-kernel loads the execution context of the first task into the ordered list of the tasks that are ready.

4. The information processing system as claimed in claim 2, wherein the interrupt is generated by a timer implemented by the control part of the micro-kernel.

5. The information processing system as claimed in claim 4, wherein the timer is paced by a quartz crystal clock configured to trigger execution of real-time application tasks by the computation part of the micro-kernel.

6. The information processing system as claimed in claim 1, wherein each core executes the system functions relating to communications between the tasks that are specific to each core.

7. The information processing system as claimed in claim 1, further comprising a memory space and a set of interrupts shared by the two cores to enable interaction of the two cores.

8. The information processing system as claimed in claim 1, wherein the two cores are processors of different types.

9. The information processing system as claimed in claim 8, wherein the processors are implemented on a single chip.

* * * * *